US 10,465,926 B2
Nov. 5, 2019

(12) United States Patent
West et al.

(54) SYSTEM AND METHOD FOR CONTINUOUSLY REMOVING A PARTICULAR TYPE OF GAS MOLECULES FROM A GAS STREAM

(71) Applicant: JOHNSON CONTROLS TECHNOLOGY COMPANY, Holland, MI (US)

(72) Inventors: Jonathan D. West, York, PA (US); Richard M. Sturgeon, Ann Arbor, MI (US); Paul Van Hoof, Dexter, MI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 409 days.

(21) Appl. No.: 14/804,483

(22) Filed: Jul. 21, 2015

(65) Prior Publication Data

US 2016/0025360 A1    Jan. 28, 2016

Related U.S. Application Data

(60) Provisional application No. 62/027,290, filed on Jul. 22, 2014.

(51) Int. Cl.
*B01D 19/00* (2006.01)
*B01D 53/14* (2006.01)
(Continued)

(52) U.S. Cl.
CPC ............ *F24F 3/16* (2013.01); *B01D 19/0068* (2013.01); *B01D 19/0073* (2013.01); *B01D 53/1425* (2013.01); *B01D 53/18* (2013.01)

(58) Field of Classification Search
CPC ......... C09K 8/584; C09K 8/602; E21B 43/16; B01D 19/0068; B01D 19/0073;
(Continued)

(56) References Cited

U.S. PATENT DOCUMENTS 5,057,368 A    10/1991   Largman et al.
5,704,966 A *  1/1998   Rohrbach ............ B01D 50/006
                                                      261/104
(Continued)

FOREIGN PATENT DOCUMENTS

CA    2259005 C    3/2006
EP    0910458 B1   8/2001
(Continued)

OTHER PUBLICATIONS

Unger et al., "Continuous Process for Automotive Cabin Air Dehumidification", 1998, Society of Automotive Engineers, Inc., United States.
(Continued)

*Primary Examiner* — Cabrena Holecek
(74) *Attorney, Agent, or Firm* — Fletcher Yoder, P.C.

(57) ABSTRACT

A method for continuously removing a particular type of gas molecules ("gas molecules") from a gas stream includes selecting a liquid having an affinity for the gas molecules to be removed, and providing the selected liquid to each of a first and second mat, each mat formed from a plurality of fibers having the ability to retain the selected liquid within longitudinally extending channels having longitudinally extending openings against moving into the space between the individual fibers, the mats in fluid communication therebetween with the selected liquid. The method includes directing the gas stream through a portion of the first mat into contact with the selected liquid along the longitudinally extending openings whereby the selected liquid absorbs the gas molecules, and directing a second gas through a portion of the second mat so that the gas molecules, absorbed by and disbursed throughout the selected liquid, are stripped and carried away.

11 Claims, 9 Drawing Sheets

(51) Int. Cl.
*B01D 53/18* (2006.01)
*F24F 3/16* (2006.01)

(58) Field of Classification Search
CPC ...... B01D 2257/708; B01D 2259/4508; B01D 53/1425; B01D 53/18; F24F 3/16
See application file for complete search history.

(56) References Cited

U.S. PATENT DOCUMENTS

| | | |
|---|---|---|
| 5,713,971 A | 2/1998 | Rohrbach et al. |
| 5,744,236 A | 4/1998 | Rohrbach et al. |
| 5,759,394 A | 6/1998 | Rohrbach et al. |
| 5,891,221 A | 4/1999 | Rohrbach et al. |
| 5,902,384 A | 5/1999 | Rohrbach et al. |
| 5,951,744 A | 9/1999 | Rohrbach et al. |
| 6,296,821 B1 | 10/2001 | Hendricks et al. |
| 6,379,564 B1 | 4/2002 | Rohrbach et al. |
| 6,398,039 B1 | 6/2002 | Xue et al. |
| 6,555,262 B1 | 4/2003 | Kaiser et al. |
| 6,623,715 B2 | 9/2003 | Hendricks et al. |
| 6,656,360 B2 | 12/2003 | Rohrbach et al. |
| 6,702,879 B2 | 3/2004 | Yokoyama et al. |
| 7,309,062 B2 | 12/2007 | Lin |
| 7,517,381 B2 | 4/2009 | Rohrbach et al. |
| 7,905,107 B2 | 3/2011 | Forkosh et al. |
| 7,942,011 B2 | 5/2011 | Forkosh |
| 7,942,387 B2 | 5/2011 | Forkosh |
| 8,293,107 B1 | 10/2012 | Lobovsky et al. |
| 8,943,844 B2 | 2/2015 | Forkosh |
| 2003/0196549 A1 | 10/2003 | Rohrbach et al. |
| 2012/0247327 A1* | 10/2012 | Omole ............... B01D 53/1425 95/51 |
| 2015/0338140 A1* | 11/2015 | Vandermeulen ........ F25B 30/04 62/238.3 |

FOREIGN PATENT DOCUMENTS

| | | |
|---|---|---|
| EP | 1024879 B1 | 3/2003 |
| WO | 9748478 A1 | 12/1997 |
| WO | 0154787 A2 | 8/2001 |
| WO | 0154796 A2 | 8/2001 |
| WO | 0166249 A2 | 9/2001 |

OTHER PUBLICATIONS

Rohrbach et al., "Shaped Fibers and Their Applications", The Exponent—Honeywell Technology Journal, pp. 1-11, Honeywell International Inc., United States.

"Liquid Desiccant Technology Delivers Energy Cost Reductions and Indoor Air Quality Improvements.", 2010, Advantix Systems, United States.

* cited by examiner

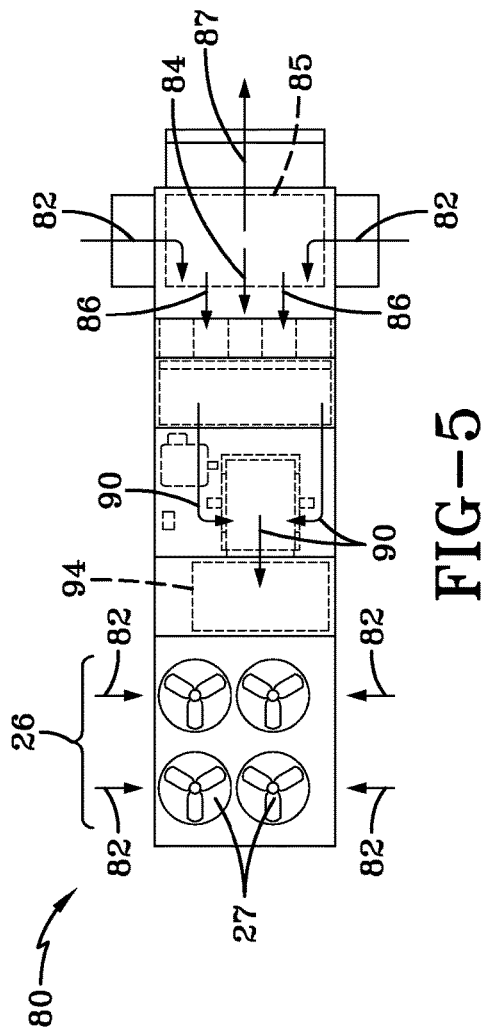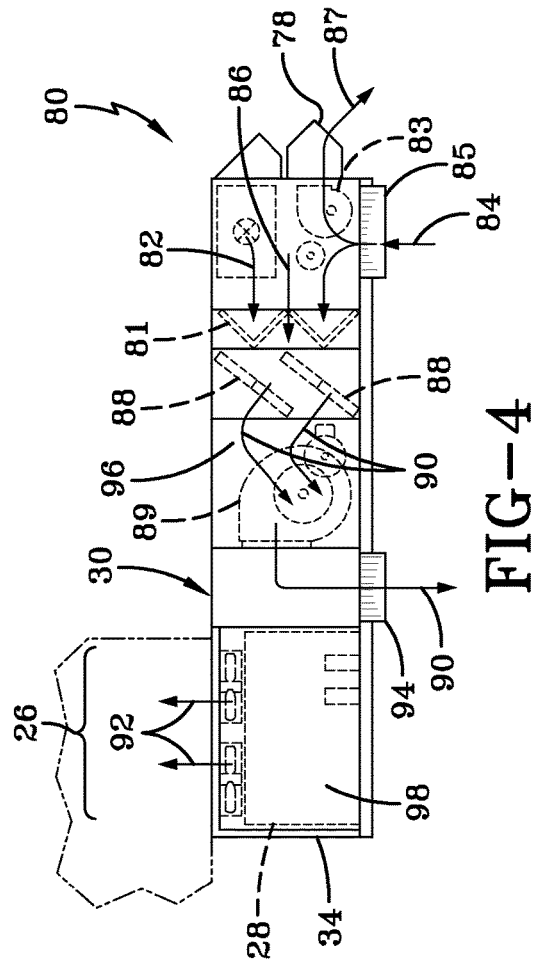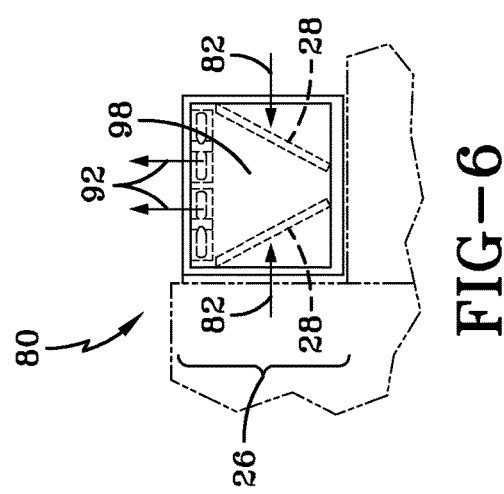

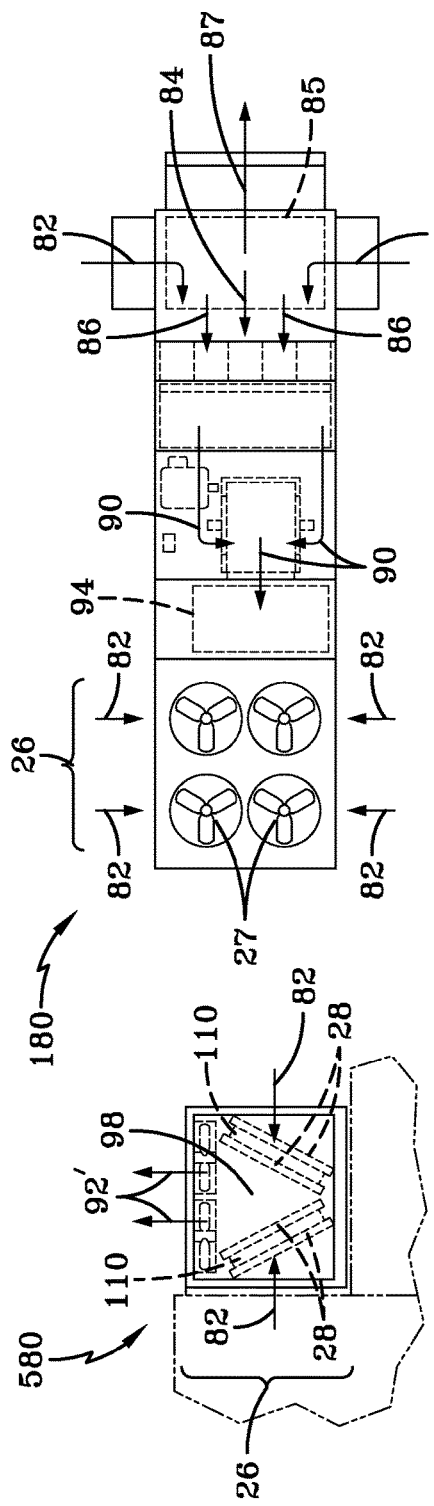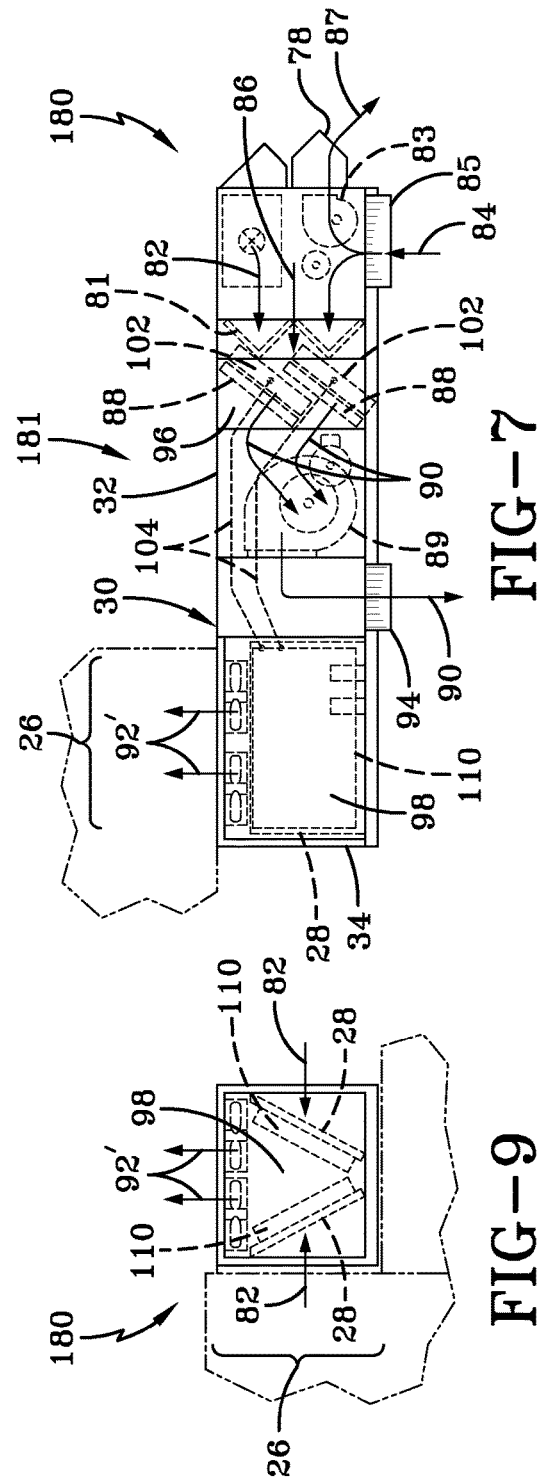

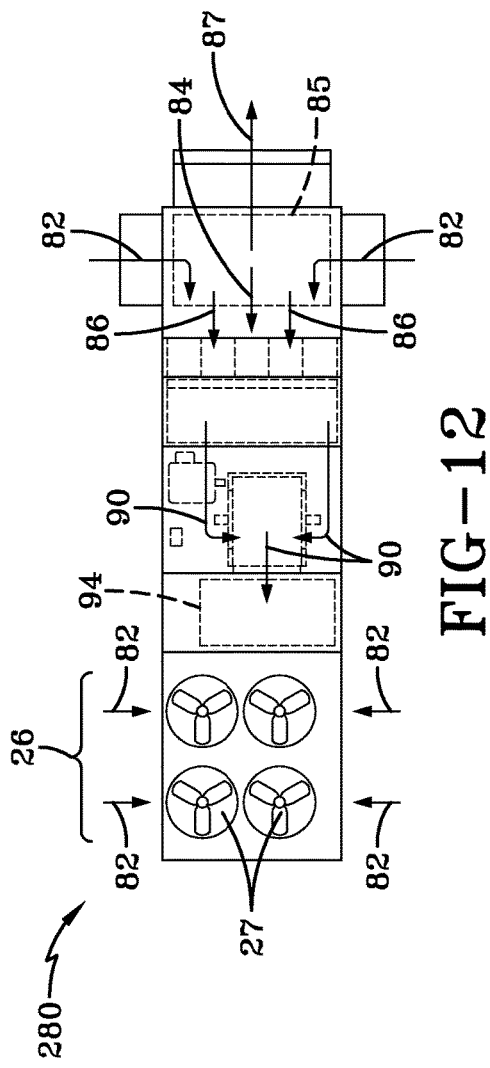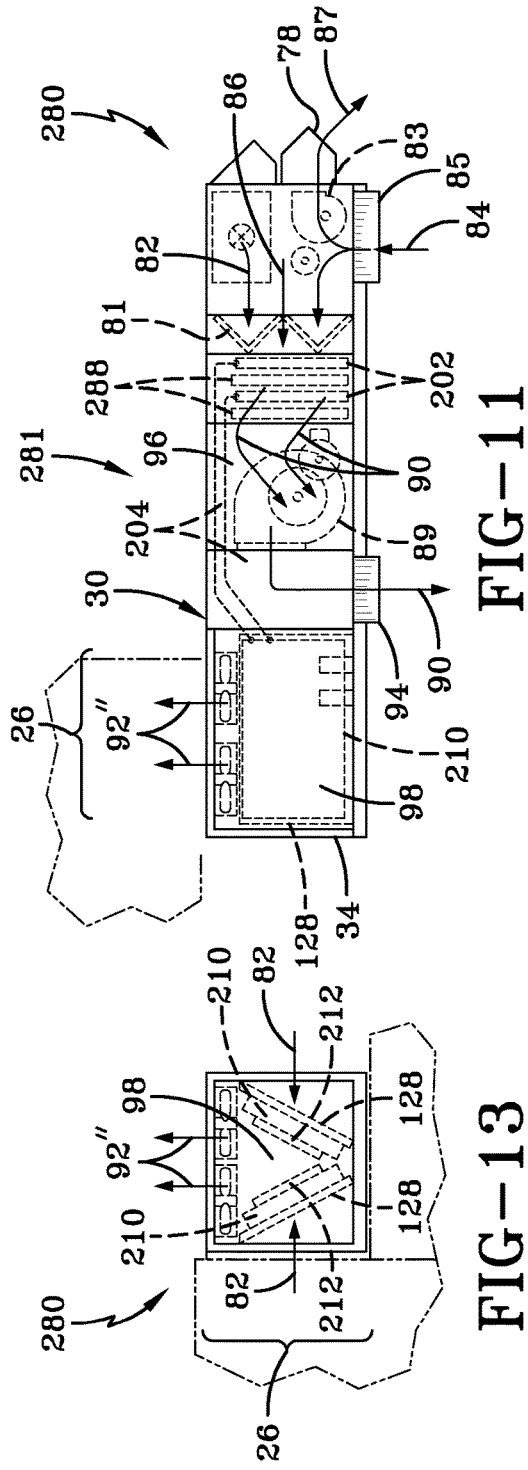

SYSTEM AND METHOD FOR CONTINUOUSLY REMOVING A PARTICULAR TYPE OF GAS MOLECULES FROM A GAS STREAM

BACKGROUND

The application relates generally to removing a particular type of gas molecules from a gas stream. The application relates more specifically to continuously removing a particular type of gas molecules from a gas stream.

Heating, ventilation, air-conditioning and refrigeration ("HVAC&R") are typically the largest contributor to an energy budget of buildings and one of the largest loads on the entire electrical grid, especially during peak hours. Conditioning outside air is particularly expensive in locations with extreme temperature and humidity. One method to reduce power requirements would be to reduce the latent load on the ventilation system. Latent load results from thermal energy released when moisture in the air is transformed from a vapor to a liquid state. Satisfying the latent load by removing moisture from the ventilated air through more efficient methodology saves energy. In hot humid climates, cooling equipment must have sufficient capacity to handle this design (worst case) load if occupants are to be comfortable. Satisfying the latent load by more efficient methods allows smaller equipment to satisfy the same load, reducing initial equipment cost as well as operating cost.

Another method to reduce energy is to lower the amount of ventilation air that is required. This can be done by cleaning the indoor air of carbon dioxide and volatile organic compounds ("VOCs") rather than relying on the dilution of these contaminants by the outside ventilation air.

Accordingly, there is an unmet need for reducing expenses associated with HVAC&R ventilation systems.

SUMMARY

One embodiment of the present disclosure is directed to a system for continuously removing a predetermined type of gas molecules from a first air stream and releasing the predetermined type of gas molecules into a second air stream, the system comprising a first plurality of fibers and a second plurality of fibers each including a longitudinally extending channel with a longitudinally extending opening. The system further includes a liquid having an affinity for the predetermined type of gas molecules disposed within the channels of the first plurality of fibers and the second plurality of fibers and a device for directing the first air stream across at least a part of the first plurality of fibers into contact with the liquid along the longitudinally extending openings whereby the liquid absorbs the predetermined type of gas molecules. The system further includes the first plurality of fibers extending from the first air stream to a collector selectably independent of the first air stream, selectably independent of the second air stream, or selectably independent of the first air stream and the second air stream. The system further includes the second plurality of fibers extending from the second air stream to the collector, the first plurality of fibers and the second plurality of fibers in fluid communication therebetween with the liquid in the collector, the second air stream stripping and carrying away the predetermined type of gas molecules. The system may selectably provide for a reversed flow direction of the predetermined type of gas molecules for continuously removing the predetermined type of gas molecules from the second air stream and releasing the predetermined type of gas molecules into the first air stream. Further, power to operate the system may be at least primarily generated by a renewable energy source, a previously unutilized energy source, or a combination thereof. Additionally, the renewable energy source may include solar energy, and the previously unutilized energy source may be generated by condenser coils of an HVAC&R unit during a cooling mode.

Another embodiment of the present disclosure is directed to a filtration device for removing a particular type of vapor molecules from a first air stream including a first housing having a first chamber and a second housing having a second chamber. A first air flow path is provided through the first chamber of the first housing for the first air stream and a second air flow path through the second chamber of the second housing for a second air stream. A first fibrous material is provided having a plurality of strands which are positioned in the first chamber to intercept the first air flow path and which extends to a collector selectably independent of the first air flow path, selectably independent of the second air flow path or selectably independent of the first air flow path and the second air flow path. A second fibrous material is provided having a plurality of strands which are positioned in the second chamber to intercept the second air flow path and which extends to the collector, the plurality of strands of the first fibrous material and the second fibrous material in fluid communication therebetween with the liquid in the collector. The plurality of strands of each of the first fibrous material and the second fibrous material are provided having a hollow internal region connected to an outer surface through at least one longitudinally extending opening. A liquid is provided for absorbing the particular type of airborne vapor molecules, the liquid disposed in the hollow internal regions of the plurality of strands of the first fibrous material and communicating through the longitudinally extending openings in the plurality of strands with the first air stream following the first air flow path through the first chamber. The liquid is provided for absorbing the particular type of airborne vapor molecules, the liquid disposed in the hollow internal regions of the plurality of strands of the second fibrous material and communicating through the longitudinally extending openings in the plurality of strands with the second air stream following the second air flow path through the second chamber. A device is provided for directing the first air stream into contact with the first airborne vapor absorbing liquid along the longitudinally extending openings whereby the airborne vapor absorbing liquid absorbs the particular type of vapor molecules through the longitudinally extending openings. The second air stream is directed through the second chamber of the second housing to pass through the portion of the second fibrous material positioned in the second chamber to strip vapor molecules absorbed by the airborne vapor absorbing liquid.

A further embodiment of the present disclosure is directed to a method for continuously removing a particular type of gas molecules from a first gas stream comprising the steps of selecting a liquid which has an affinity for the particular type of gas molecules to be removed. The method further includes providing the selected liquid to each of a first mat and a second mat, each mat formed from a plurality of fibers which have the ability to retain the selected liquid within longitudinally extending channels having longitudinally extending openings against moving into the space between the individual fibers, the first mat and the second mat in fluid communication therebetween with the selected liquid. The method further includes directing the first gas stream through a portion of the first mat into contact with the selected liquid along the longitudinally extending openings whereby the selected liquid absorbs the particular type of gas molecules. The method further includes directing a second gas stream through a portion of the second mat so that the particular type of gas molecules, which have been absorbed by and disbursed throughout the selected liquid, are stripped and carried away.

BRIEF DESCRIPTION OF THE FIGURES

FIGS. 4-6 show different orthogonal views of an exemplary ventilation system.

FIGS. 7-9 and 9A show different orthogonal views of an exemplary ventilation system.

FIGS. 11-13 show different orthogonal views of an exemplary ventilation system.

DETAILED DESCRIPTION OF EXEMPLARY EMBODIMENTS

Figure 1:
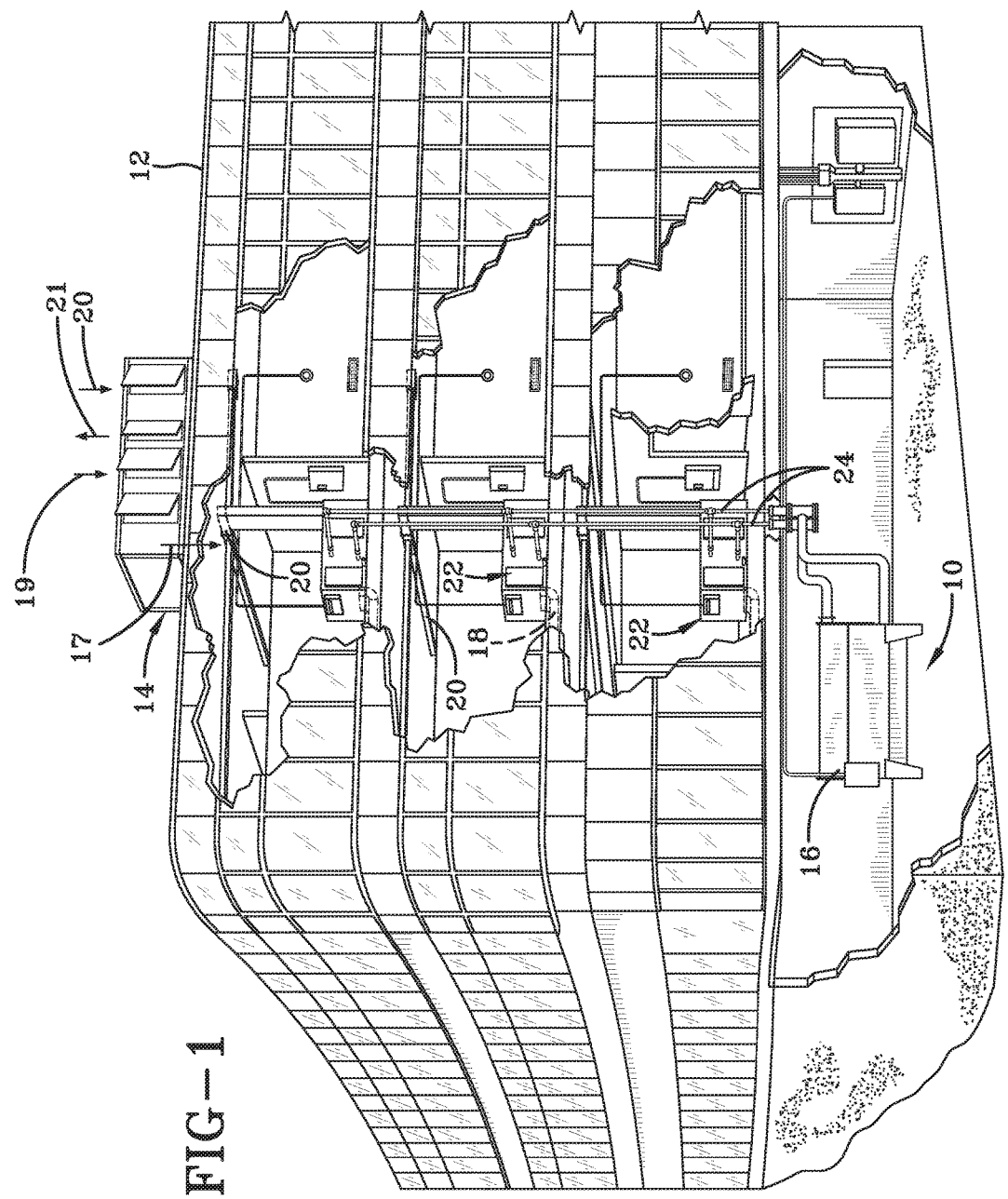
FIG. 1 shows an exemplary embodiment for a heating, ventilation and air conditioning (HVAC&R) system.

FIG. 1 shows an exemplary environment for an HVAC&R system 10 in a building 12 for a typical commercial setting. System 10 may include a compressor (not shown) incorporated into a chiller 16 that can supply a chilled liquid that may be used to cool building 12. In one embodiment, compressor 38 may be a screw compressor 38 (see for example, FIG. 2). In other embodiments compressor 38 may be a centrifugal compressor, scroll compressor, or reciprocal compressor (not shown). System 10 includes an air distribution system 14 that circulates air through building 12. The air distribution system 14 can include ducts for directing outside air 19, exhaust air 21, return air 20, and supply air 17. The air distribution system 14 also includes an air handler 22. Air handler 22 can include a heat exchanger (not shown) that is connected to a boiler (not shown) and chiller 16 by conduits or chilled water pipes 24. Air handler 22 may receive either heated liquid from the boiler or chilled liquid from chiller 16, depending on the mode of operation of HVAC&R system 10. HVAC&R system 10 is shown with a separate air handler on each floor of building 12, but it will be appreciated that these components may be shared between or among floors. In another embodiment, the system 10 may include an air-cooled chiller that employs an air-cooled coil as a condenser. An air-cooled chiller may be located on the exterior of the building—for example, adjacent to or on the roof of the building. Another embodiment is a packaged roof top unit ("RTU") that combines an air cooled chiller and an air handler.

Figure 2:
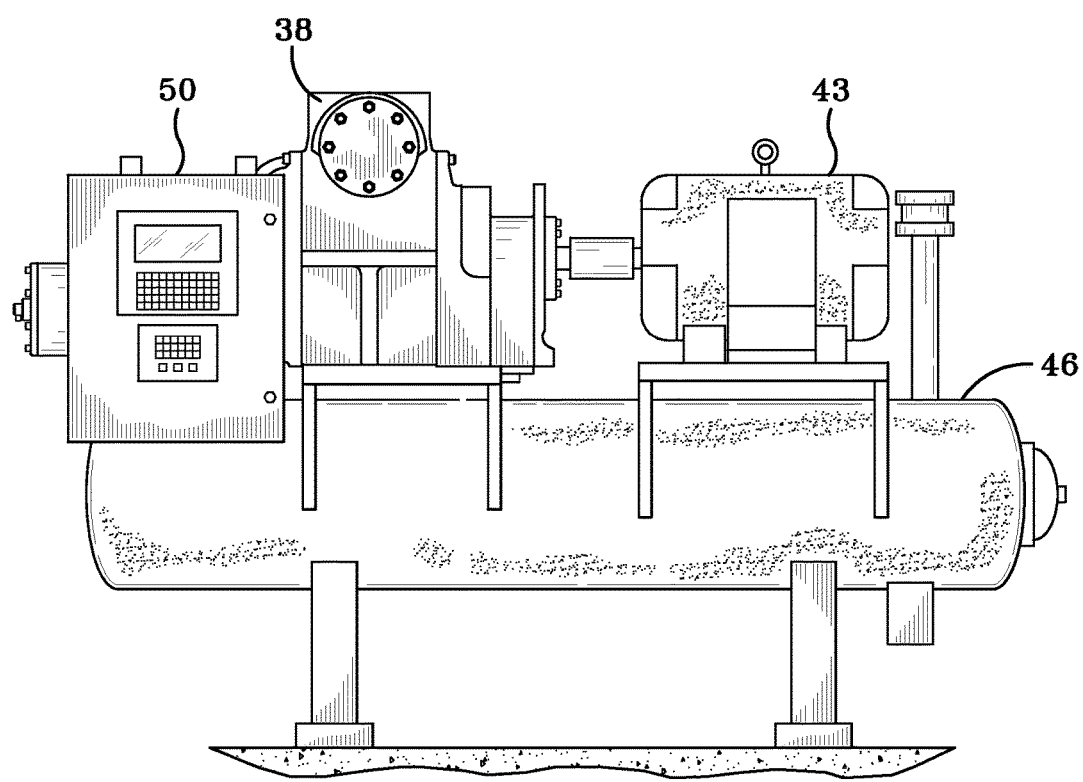
FIG. 2 shows an exemplary embodiment of a compressor unit of an HVAC&R system.

FIG. 2 shows an exemplary embodiment of a screw compressor in a packaged unit for use with chiller 16. The packaged unit includes a screw compressor 38, a motor 43 to drive screw compressor 38, a control panel 50 to provide control instructions to equipment included in the packaged unit, such as motor 43. An oil separator 46 can be provided to remove entrained oil (used to lubricate the rotors of screw compressor 38) from the discharge vapor before providing the discharge vapor to its intended application.

Figure 3:
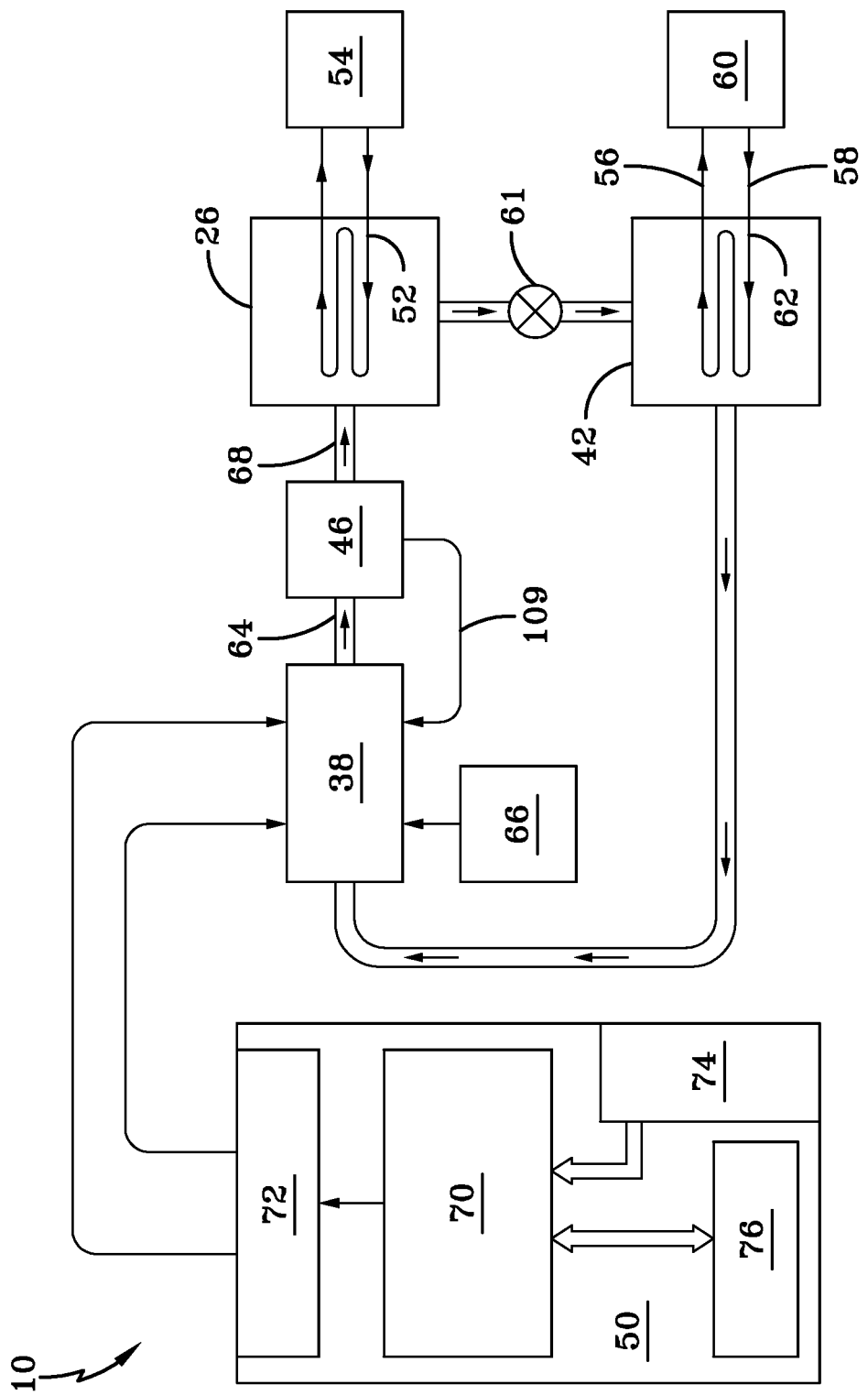
FIG. 3 schematically illustrates an exemplary embodiment of an HVAC&R system.

FIG. 3 shows an exemplary HVAC&R or liquid chiller system 10, which includes compressor 38, condenser 26, water chiller or evaporator 42, and a control panel 50. Control panel 50 may include a microprocessor 70, an interface board 72, an analog-to-digital (A to D) converter 74, and/or a non-volatile memory 76. Control panel 50 may be positioned or disposed locally and/or remotely to system 10. Control panel 50 receives input signals from system 10. For example, temperature and pressure measurements may indicate the performance of system 10. The signals may be transmitted to components of system 10, for example, a compressor capacity control signal, to control the operation of system 10. Conventional liquid chiller or HVAC&R system 10 may include other features that are not shown in FIG. 3 and have been purposely omitted to simplify the drawing for ease of illustration. While the following description of system 10 is in terms of a liquid chiller system, it is to be understood that the invention could be applied to any refrigeration system or any HVAC&R system.

Compressor 38 compresses a refrigerant vapor and delivers the vapor to condenser 26 through a discharge pipe 68. Compressor 38 may be any suitable type of compressor including screw compressor, reciprocating compressor, scroll compressor, rotary compressor or other type of compressor. System 10 may have more than one compressor 38 connected in one or more refrigerant circuits.

Refrigerant vapor delivered to condenser 26 enters into a heat exchange relationship with a fluid, for example, air or water, and undergoes a phase change to a refrigerant liquid as a result of the heat exchange relationship with the fluid. The condensed liquid refrigerant from condenser 26 flows to evaporator 42. Refrigerant vapor in condenser 26 enters into the heat exchange relationship with water, flowing through a heat exchanger coil 52 connected to a cooling tower 54. Alternatively, the refrigerant vapor is condensed in a coil with heat exchange relationship with air blowing across the coil. The refrigerant vapor in condenser 26 undergoes a phase change to a refrigerant liquid as a result of the heat exchange relationship with the water or air in heat exchanger coil 52.

Evaporator 42 may include a heat exchanger coil 62 having a supply line 56 and a return line 58 connected to a cooling load 60. Heat exchanger coil 62 can include a plurality of tube bundles within evaporator 42. A secondary liquid, for example, water, ethylene, calcium chloride brine, sodium chloride brine, or any other suitable secondary liquid travels into evaporator 42 via return line 58 and exits evaporator 42 via supply line 56. The liquid refrigerant in evaporator 42 enters into a heat exchange relationship with the secondary liquid in heat exchanger coil 62 to chill the temperature of the secondary liquid in heat exchanger coil 62. The refrigerant liquid in evaporator 42 undergoes a phase change to a refrigerant vapor as a result of the heat exchange relationship with the secondary liquid in heat exchanger coil 62. The vapor refrigerant in evaporator 42 exits evaporator 42 and returns to compressor 38 by a suction line to complete the cycle. While system 10 has been described in terms of condenser 26 and evaporator 42, any suitable configuration of condenser 26 and evaporator 42 can be used in system 10, provided that the appropriate phase change of the refrigerant in condenser 26 and evaporator 42 is obtained.

In one embodiment, chiller system capacity may be controlled by adjusting the speed of a compressor motor driving compressor 38, using a variable speed drive (VSD).

It is appreciated that HVAC&R systems can also include conventional heat pumps, which are not further discussed herein.

To drive compressor 38, system 10 includes a motor or drive mechanism 66 for compressor 38. While the term "motor" is used with respect to the drive mechanism for compressor 38, the term "motor" is not limited to a motor, but may encompass any component that may be used in conjunction with the driving of compressor 38, such as a variable speed drive and a motor starter. Motor or drive mechanism 66 may be an electric motor and associated components. Other drive mechanisms, such as steam or gas turbines or engines and associated components may be used to drive compressor 38.

The control panel executes a control system that uses a control algorithm or multiple control algorithms or software to control operation of system 10 and to determine and implement an operating configuration for the inverters of a VSD (not shown) to control the capacity of compressor 38 or multiple compressors in response to a particular output capacity requirement for system 10. The control algorithm or multiple control algorithms may be computer programs or software stored in non-volatile memory 76 of control panel 50 and may include a series of instructions executable by microprocessor 70. The control algorithm may be embodied in a computer program or multiple computer programs and may be executed by microprocessor 70, the control algorithm may be implemented and executed using digital and/or analog hardware (not shown). If hardware is used to execute the control algorithm, the corresponding configuration of control panel 50 may be changed to incorporate the necessary components and to remove any components that may no longer be required.

Chiller system 10, as illustrated in FIG. 3, includes compressor 38 in fluid communication with an oil separator 46. An oil and refrigerant gas mixture travels along discharge pipe 64 from compressor 38 to oil separator 46. Compressor 38 is in fluid communication with oil separator 46 via oil return line 109. Condenser 26 is provided in fluid communication with oil separator 46, and refrigerant gas travels from oil separator 46 to condenser 26. At condenser 26, refrigerant gas is cooled and condensed into a refrigerant liquid, which is in turn transmitted to evaporator 42 through expansion valve 61. At evaporator 42, heat transfer takes place between the refrigerant liquid and a second fluid that is cooled to provide desired refrigeration. The refrigerant liquid in evaporator 42 is converted into a refrigerant gas by absorbing heat from the chilled liquid and returns to compressor 38. This refrigeration cycle continues when the chiller system is in operation.

FIGS. 4-6 show an exemplary embodiment of a self contained cooling system with ventilation system 80 for an HVAC&R system 10 (FIG. 1). Ventilation system 80 includes a structure commonly referred to as an air handler or rooftop air handling unit or a packaged rooftop unit 30, which typically is positioned on an upper surface of building 12 (FIG. 1) having its temperature maintained by the HVAC&R system. As further shown in FIGS. 4-6, rooftop unit 30 receives outside air 82, and return air 84 from a return air opening 85. A portion of return air 84 is mixed together with the outside air 82 forming mixed air 86 that is filtered by filter 81 and brought into thermal contact with cooling coils 88 for reducing the temperature and the amount of water vapor entrained in mixed air 86, becoming supply air 90. Supply air 90 is then pushed by a fan 89 through an opening 94 into building 12 (FIG. 1). A portion of return air 84 is pushed by a fan 83 through an opening 78, becoming exhaust air 87.

As further shown in FIGS. 5 and 6, rooftop unit 30 (FIG. 4) includes condenser 26 having fans 27 for drawing outside air 82 into thermal heat exchange with condenser coils 28 for cooling refrigerant flowing through condenser coils 28, discharging heated air 92.

FIGS. 7-9 show a ventilation system 180 that operates in a manner similar to that of ventilation system 80. Ventilation system 180 also includes a filtration device or gas removal system 181 that includes a pair of pre-dehumidifier fiber banks or mats 102 positioned upstream of cooling coils 88 for removing water vapor molecules from mixed air 86, releasing the water vapor molecules in a pair of regeneration fiber banks or mats 110, and then stripping the water vapor molecules from fiber mats 110. In another embodiment of the gas removal system, the number of mats 102, 110 may be different than two (a pair).

Figure 17:
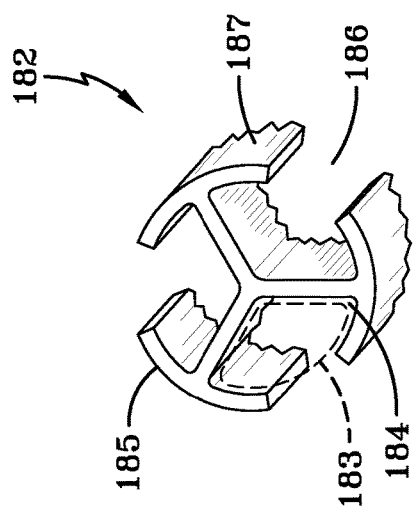
FIG. 17 shows an exemplary embodiment of a fiber of a fiber mat.

As shown in FIG. 17, fiber mats 102, 110 (FIGS. 7, 9) are formed of fibers 182 containing a gas molecule absorbing liquid 183 having an affinity for the particular airborne gases of interest. This liquid is positioned or disposed within internal cavities or channels 184 formed in the individual fibers 182. Liquid 183 selected uses absorption rather than adsorption as its mechanism to dehumidify the air stream. In one embodiment, liquid carrier or liquid 183 may be utilized to decontaminate or purify the air stream. The absorption liquids 183 used are selected to absorb the vapors of interest, to be non-hazardous and to neutralize specific gases and odor vapors. To assist in this absorption, additives can be used in conjunction with liquid 183 in order to facilitate absorption of particular gases, e.g., lithium chloride or calcium chloride for water vapor removal or an amine, such as monoethanolamine (MEA) for removal of carbon dioxide vapor or other organic compound vapor. It is well known to those skilled in the art that the possible combinations of liquid carriers is virtually unlimited. The selected liquid carrier or absorption liquid should be capable of lightly absorbing a particular gas molecule in a reversible manner so that the particular gas molecule can be easily removed or stripped off. In certain instances, it may be desirable to add water vapor molecules to the outside air provided for ventilation of a building.

A fiber which is particularly suitable for practicing this invention is disclosed in U.S. Pat. No. 5,057,368, which is incorporated by reference in its entirety. This patent discloses a trilobal or quadrilobal fiber formed from thermoplastic polymers wherein the fiber has a cross-section with a central core and three or four T-shaped lobes 185 (FIG. 17). In other embodiments, the number of lobes may be less three or more than four. The legs of the lobes intersect at the core so that the angle between the legs of adjacent lobes is from about 80 degrees to about 130 degrees. The thermoplastic polymer is typically a nylon, a polyester, a polyolefin or a combination thereof. Fiber 182 as illustrated in FIG. 17 is formed as an extruded strand having three hollow interior longitudinally extending cavities or openings or channels 184 each of which communicates with the outer or external strand surface by way of longitudinal extending slots or openings 186. In one embodiment, fiber 182 resembles a "C", i.e., absent a central core, with one cavity or channel 184 and one longitudinal extending slot or opening 186. The fibers 182 are relatively small, having a diameter of about 30 to about 250 microns. The capillary forces within the individual cavities or channels 184 are so much greater than those external to the fiber 182 that the absorptive liquid is readily retained within the interior of the fiber 182 without appreciable wetting of the external surfaces 187 or filling the inter fiber voids. The fibers 182 strongly retain the liquid through capillary action so that each fiber mat 102, 110 (FIG. 7) is not wet to the touch and the liquid will not shake off. In fiber mat 102, 110 of such fibers 182, the area between the individual strands remains relatively free of the gas absorbing liquid with which the internal cavities or channels 184 of each fiber 182 are filled. The fiber element may be made of one or more types of material strands such as nylon, polyester, or polyolefins. The three T-shaped cross-section segments may have their outer surface 187 curved, as shown in FIG. 17, or straight. In addition, other external or internal fibers with C-shaped or other cross sections may also be suitable for the gas absorbing liquid.

Figure 18:
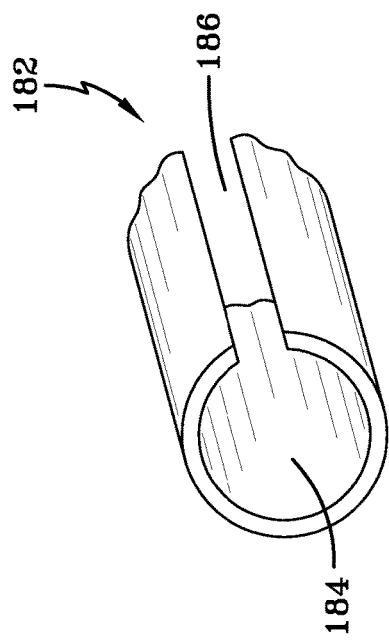
FIG. 18 shows an exemplary embodiment of a fiber of a fiber mat.

For example, FIG. 18 shows an enlarged view of a C-shaped fiber 182 with a channel 184 and a longitudinal extending slot or opening 186. The size of the opening 186 relative to the circumference of the fiber 182 is not critical, provided the selected fibers have the desired properties. The specific shape of the fibers is not important so long as the fibers selected can hold the absorption liquid to its surface so that it is not easily displaced.

FIGS. 7-9 show a continuous gas molecule capturing and removal system 181 according to the present disclosure. Gas removal system 181 utilizes filter elements or filter mats 102, 110 formed from numerous fibers 182, as shown in FIG. 17, containing a gas molecule absorbing liquid 183. Filter element or filter mat 102 extends from an air stream to be cleaned (mixed air 86) in a chamber 96 of rooftop unit 30 via conduits 104 into another air stream in a chamber 98 of condenser 26 (from outside air 82, becoming heated air 92' after flowing through filter mat 110 in condenser 26) which can strip and remove some of the previously discussed particular gas molecules from the absorbing liquid. In one embodiment, filter elements or filter mats 102, 110 may include different gas molecule absorbing liquid 183 such that filter mats 102, 110 may be capable of absorbing a plurality of different gas molecules. In another embodiment, multiple filter elements or filter mats 102, 110 may each include different gas molecule absorbing liquids, with respective filter mats positioned in close proximity with each other. In one embodiment, filter mats 102, 110 can be positioned in respective chambers remotely relative to one another, which is possible through the use of conduits 104.

For purposes herein, the terms filter element, filter mat, fiber mat, fiber bank, filtering fiber bank, filtering fiber mat and the like may be used interchangeably.

Many common materials which are effective agents may restrict circulation of air through the material. For example, wetting a common towel with water essentially seals the material against air flow therethrough. By using fibers, such as shown in FIG. 17, where the gas absorbing liquid is maintained within the cavities or channels 184 of fiber 182, unrestricted air flow about the outside of the individual fibers 182 is maintained.

Figure 10A:
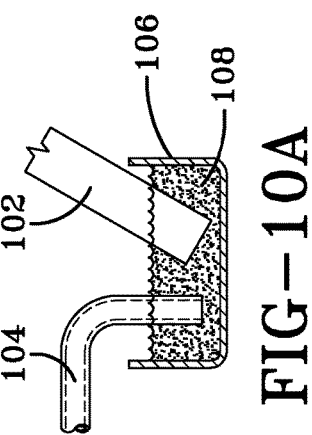
FIGS. 10A, 10B and 10C show exemplary embodiments of collectors for maintaining fiber mats in fluid communication.
Figure 10B:
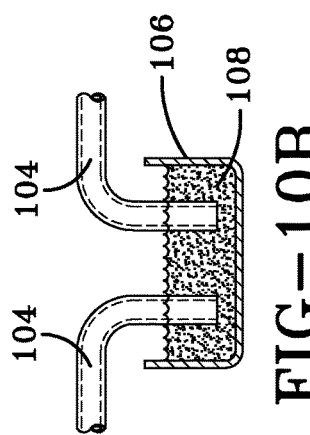

As further shown in FIGS. 7-9, the disclosed gas removal system 181 includes a gas removal or absorption chamber 96 and a stripping chamber 98 formed within rooftop unit 30. The filter element or filter mat 102, 110 consists of numerous fibers 182 (FIG. 17) disposed or positioned generally parallel and oriented to extend within both chambers 96, 98. As shown in FIGS. 7-9, rooftop unit 30 includes a housing 32 associated with the absorption chamber 96 and a housing 34 associated with stripping chamber 98, such that housing 32 and absorption chamber 96 are separate from respective stripping chamber 98 and housing 34. As shown in FIGS. 10A, 10B, 100, conduits 104 extend between and are maintained in fluid communication with fiber mats 102 and fiber mats 110 by virtue of exemplary embodiments of a collector 106, as will be discussed in further detail below. The air stream to be cleaned enters chamber 96 and is directed through at least a portion of filtering fiber mats 102 which are disposed across chamber 96. Preferably, all air flowing through chamber 96 flows through the mesh of fibers 182 (FIG. 17) of fiber mats 102. Many fibers 182 of the mesh of fibers of fiber mats 102 (and fiber mats 110) are impregnated with gas molecule absorbing liquid 183 (FIG. 17), the fibers 182 having sufficient thickness so that the entire air stream flowing through chamber 96 comes into intimate contact with the selected liquid within the cavities or channels 184 of the fibers 182. The selected liquid 183, which has an affinity for the particular gas molecules, absorbs the gas molecules and thus, removes the gas molecules from the air stream through chamber 96.

As shown in FIG. 7 and FIGS. 10A, 10B and 10C, conduit 104 extends between respective fiber mats 102 and 110. Conduit 104 can directly extend from one of fiber mats 102 or 110, or alternately, can indirectly extend from one or both of fiber mats 102 and 110. The term "directly extend" is intended to include arrangements in which one of the fiber mats and the conduit are of unitary construction. The term "indirectly extend" is intended to include arrangements in which the fiber mats and the conduit are separated relative to one another. For example, FIG. 10A shows an end of conduit 104 opposite fiber mat 110, which conduit 104 may or may not directly extend from fiber mat 110, with the end of conduit 104 positioned in a collector 106 containing the transport liquid 108. A portion of fiber mat 102 is positioned in transport liquid 108 of collector 106. In this arrangement, conduit 104 is in fluid communication with fiber mat 102 via transport liquid 108. Transport liquid 108 similarly has an affinity for the particular gas molecules of selected liquid 183. However, by virtue of liquid 108 maintaining fluid communication between conduit 104 and fiber mat 102, thermal conduction that would normally occur between conduit 104 and filter mat 102 if conduit 104 and fiber mat 102 were directly connected, i.e., of one piece or unitary construction, is prevented, thereby minimizing thermal transfer through the fiber. Such thermal transfer would add heat from the regeneration process to the supply air that is being cooled. In one embodiment, conduit 104 includes an outer cover which ensures the fibers contained therein remain at least substantially submersed in selected liquid 183, transport liquid 108 or a combination thereof. For purposes herein, transfer liquid or liquid or liquid 108 and gas molecule absorbing liquid 183 may be used interchangeably.

FIG. 10B shows ends of conduit 104 opposite fiber mats 102, 110, which conduits 104 may or may not directly extend from respective fiber mats 102, 110, with the ends of conduit 104 positioned in a collector 106 containing the transport liquid 108. A portion of fiber mat 102 is positioned in transport liquid 108 of collector 106. In this arrangement, conduit 104 is in fluid communication with at least one of fiber mats 102, 110 via transport liquid 108. In another embodiment, a plurality of conduits 104 may be interconnected in a manner as shown in FIG. 10B.

Figure 10C:
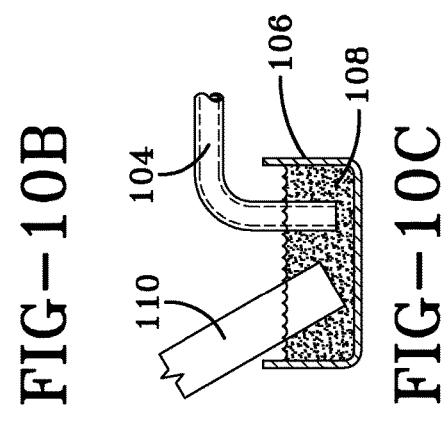

FIG. 10C shows an end of conduit 104 opposite fiber mat 102, which conduit 104 may or may not directly extend from fiber mat 102, with the end of conduit 104 positioned in a collector 106 containing the transport liquid 108. A portion of fiber mat 110 is positioned in transport liquid 108 of collector 106. In this arrangement, conduit 104 is in fluid communication with fiber mat 110 via transport liquid 108. Transport liquid 108 similarly has an affinity for the particular gas molecules of selected liquid 183.

As shown in FIGS. 7-9 and FIGS. 10A, 10B and 100, collector 106 containing transfer liquid 108 can be located at any position between fiber mats 102, 110, including being positioned at least partially inside of housing 32 of absorption chamber 96, being positioned at least partially inside of housing 34 of stripping chamber 98, or being positioned between housing 32 of absorption chamber 96 and housing 34 of stripping chamber 98. As a result of the broad range of positions of the collector and transport liquid relative to fiber mats 102, 110 associated with respective absorption chamber 96 and stripping chamber 98, any combination of connections of fibers 182 (FIG. 17) of fiber mats 102, 110 and collector 106 is deemed to be selectably independent of the air stream to be cleaned from chamber 96 (mixed air 86; FIG. 7) to collector 106, selectably independent of the stripping air stream of chamber 98 (from outside air 82, becoming heated air 92' after flowing through filter mat 110 in condenser 26; FIG. 7), or selectably independent of each of the air streams.

FIGS. 7-9 show a continuous gas molecule capturing and removal system 181 according to the present disclosure. Gas removal system 181 utilizes filter elements or filter mats 102, 110 formed from numerous fibers 182, as shown in FIG. 17, containing a gas molecule absorbing liquid 183. Filter element or filter mat 102 extends from an air stream to be cleaned (mixed air 86) in a chamber 96 of rooftop unit 30 via conduits 104 into another air stream in a chamber 98 of condenser 26 (from outside air 82, becoming heated air 92' after flowing through filter mat 110 in condenser 26) which can strip and remove some of the previously discussed particular gas molecules from the absorbing liquid.

FIGS. 11-13 show a ventilation system 280 that operates in a manner similar to that of ventilation system 180. Gas removal system 281 utilizes filter elements or filter mats 202, 288 formed from numerous fibers 182, as shown in FIG. 17, each containing gas molecule absorbing liquid 183. As further shown in FIGS. 11-13, filter elements or filter mats 202, 288 are alternately arranged in close proximity in chamber 96, although other arrangements may be used. Filter elements or filter mats 202, 288 each extend from an air stream to be cleaned (mixed air 86) in a chamber 96 of rooftop unit 30 via conduits 204 to corresponding filter mats 210, 212 positioned in another air stream in a chamber 98 of condenser 26. As a result, outside air 82, becoming heated air 92" after flowing through condenser coils 128 and corresponding filter mats 210, 212 in condenser 26, can strip and remove some of the previously discussed particular gas molecules from the absorbing liquid.

Returning to FIGS. 7-9 the fibers, containing the liquid with the absorbed particular gas molecules, extend into a stripping chamber 98 wherein an air stream passes over the fibers 182 (FIG. 17) and strips away and carries to an exhaust the particular gas molecules. A concentration factor-induced molecular migration effectively conveys the particular gas molecules within the liquid from the air stream to be cleaned within chamber 96 into the stripping air stream through chamber 98. The stripping air stream may be heated or otherwise modified or treated to facilitate removal of the particular gas molecules. The size of chambers 96 and 98 and the flow rates of the air streams can be designed to suit a particular application. The selected liquid acts as a shuttling carrier capable of transporting gases from fiber mat 102 in chamber 96, then through conduit 104 to fiber mat 110 in the stripping chamber 98.

In one embodiment, as shown in ventilation system 580 of FIG. 9A, condenser coils 28 can be arranged (i.e., split) such that corresponding fiber mats 110 are positioned between adjacent portions of condenser coils 28. As a result of the regeneration process (stripping and removal of particular gas molecules from the absorbing liquid in the fibers of fiber mats 110), the air stream passing over the fibers is cooled, improving efficiency of condenser 26 and the HVAC&R system.

The method of operation and the apparatus of this disclosure should now be clear. Particular airborne material, possibly including gas contaminants, are removed from an air stream by interposing a plurality of at least partially hollow fibers 182 in the air stream. The hollow portions or channels 184 of the fibers contain a liquid, including a component having an affinity for the particular material or gas, which communicates with the air stream through an opening 186. The particular material or gas is absorbed by the liquid within the fibers 182. The particular material or gas in solution within the liquid is then conveyed from the cleaned air stream by a concentration factor-induced molecular migration into an exhaust or stripping air stream which strips and carries away the particular material or gas molecules.

Figure 15:
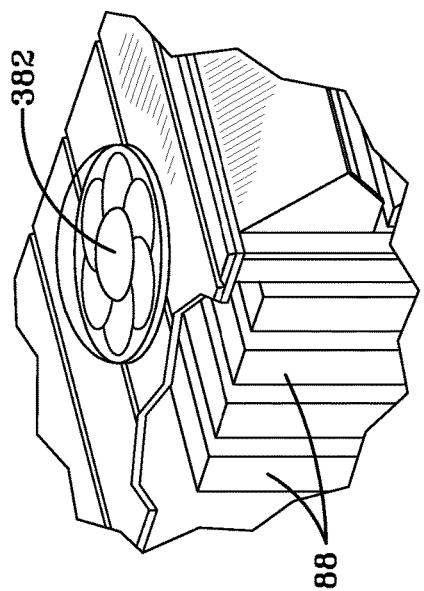
FIG. 15 shows an enlarged region of FIG. 14 further showing an exemplary regeneration device.
Figure 14:
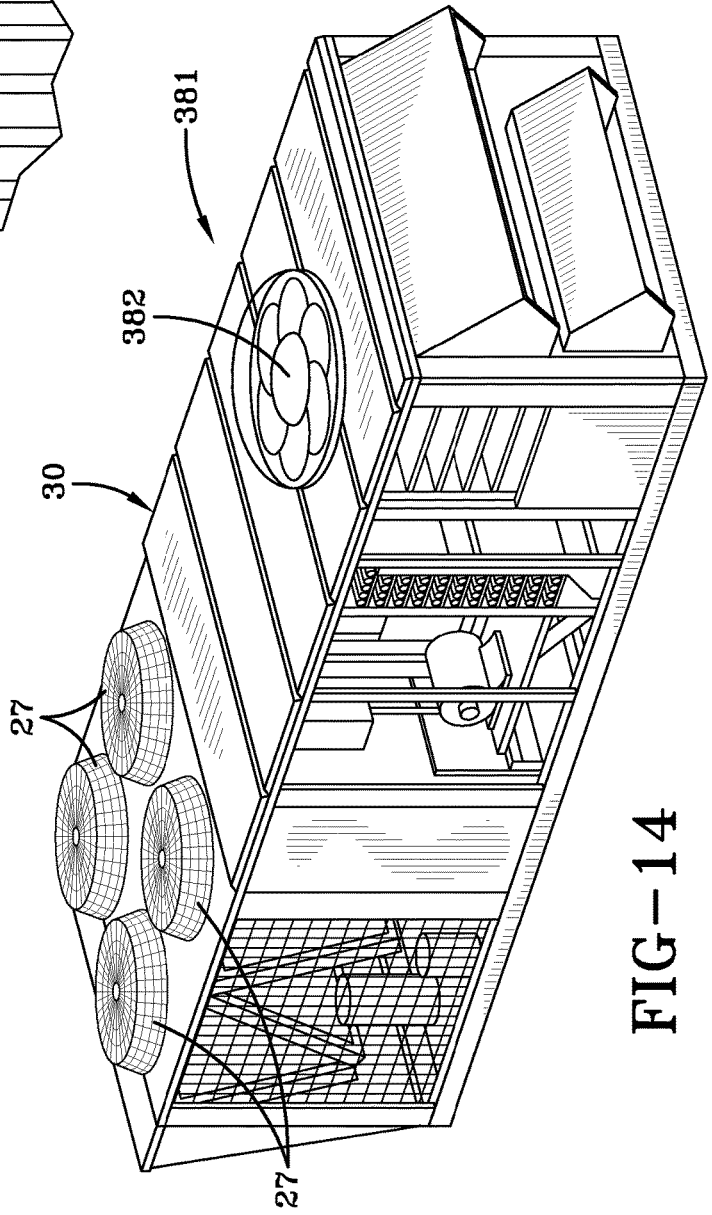
FIG. 14 shows an exemplary ventilation system.

As shown in FIGS. 14-15, a ventilation system 380 operates in a manner similar to that of ventilation system 180, as previously discussed. However, ventilation system 380 utilizes a regeneration device or gas removal system 381, such as a solar regeneration device 382 that generates heat to a portion of fiber mat(s) 388 extending outwardly from rooftop unit 30 to regenerate the fiber mats 388, resulting in a concentration factor-induced molecular migration, for conveying the particular gas molecules within the liquid from the air stream to be cleaned, exterior of rooftop unit 30, which heating also facilitates removal of the particular gas molecules.

Figure 16:
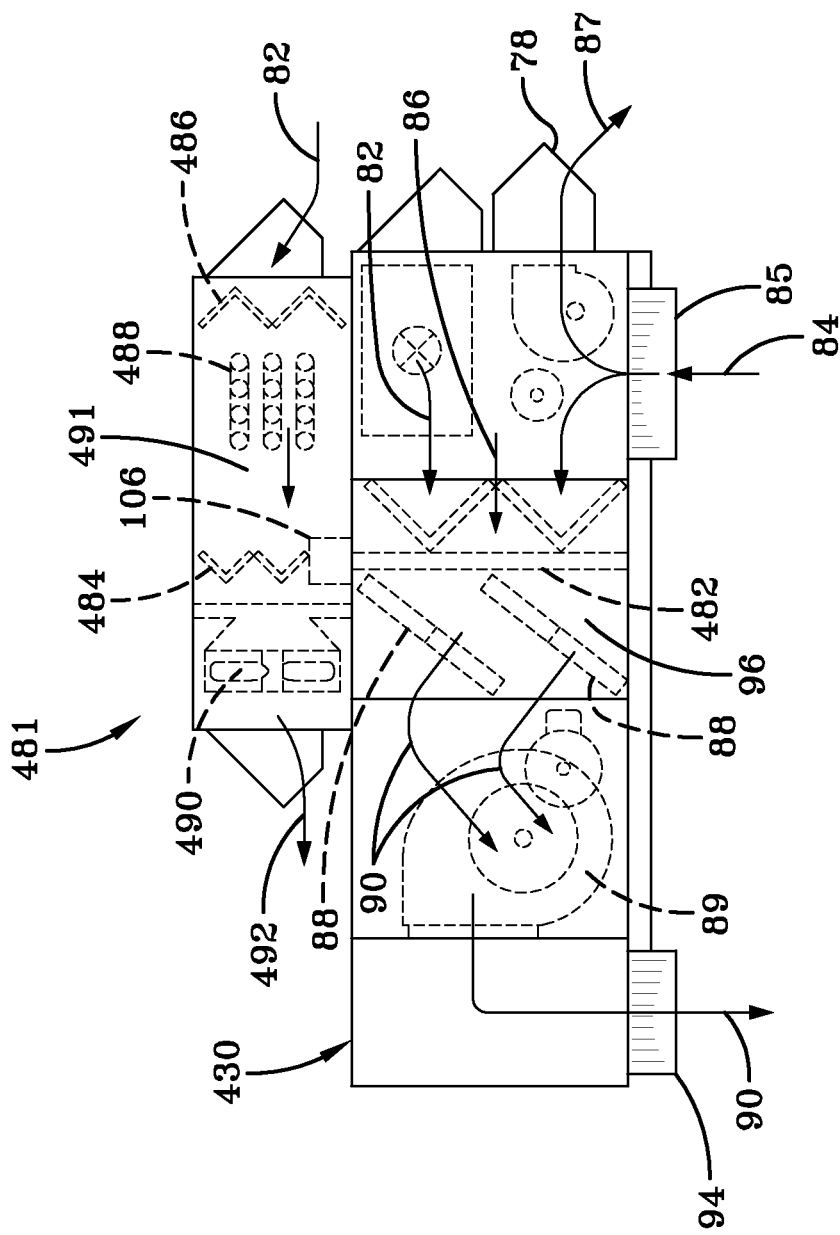
FIG. 16 shows an exemplary ventilation system.

As shown in FIG. 16, a rooftop unit 430 receives outside air 82, and return air 84 from a return air opening 85. A portion of return air 84 is mixed together with the outside air 82 forming mixed air 86 that is filtered by filter 81 and brought into thermal contact with cooling coils 88 for reducing the temperature and the amount of water vapor entrained in mixed air 86, becoming supply air 90. Supply air 90 is then pushed by a fan 89 through an opening 94 into building 12 (FIG. 1). A portion of return air 84 is pushed by a fan 83 through an opening 78, becoming exhaust air 87.

Rooftop unit 430 further includes a gas removal system or regeneration unit 481 which can be secured directly to or in close proximity to rooftop unit 430, if desired. Regeneration unit 481 includes a de-humidifier fiber mat 482 in chamber 96 of rooftop unit 30 operably connected via a collector 106 to a regeneration fiber mat 484 of regeneration unit 481. In one embodiment, fiber mat 482 and fiber mat 484 can be of unitary (one-piece) construction. Regeneration unit 481 receives outside air 82 that is filtered by particle filter 486, heated by heater 488, and pushed via a fan 490 through a chamber 491, producing regenerated return air 492 in order to regenerate fiber mat 484. Collector 106 is in fluid communication between fiber mat(s) 482 and fiber mat(s) 484 that are selectably independent of the air stream flowing through chamber 96, selectably independent of the air stream flowing through chamber 491, or selectably independent of the air stream flowing through chamber 96 and chamber 491.

It is to be understood that the gas removal systems disclosed herein or are contemplated by the present disclosure may be added to most existing ventilation systems of HVAC&R units.

While only certain features and embodiments of the invention have been shown and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation-specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A heating, ventilating, and air conditioning (HVAC) system for continuously removing a predetermined type of gas molecules from a first air stream and releasing the predetermined type of gas molecules into a second air stream, the HVAC system comprising:
    a first plurality of fibers and a second plurality of fibers disposed within the HVAC system, each comprising a longitudinally extending channel with a longitudinally extending opening, wherein the second plurality of fibers is positioned downstream of condenser coils of the HVAC system relative to the second air stream, and wherein the condenser coils are configured to heat the second air stream before the second air stream is directed through the second plurality of fibers;
    a liquid having an affinity for the predetermined type of gas molecules disposed within the channels of the first plurality of fibers and the second plurality of fibers; and
    a fan configured to direct the first air stream through the HVAC system and across at least a part of the first plurality of fibers into contact with the liquid along the longitudinally extending openings whereby the liquid is configured to absorb the predetermined type of gas molecules;
    wherein the first plurality of fibers is fluidly coupled with a collector configured to collect the liquid, wherein the collector is separate from the first air stream, separate from the second air stream, or separate from the first air stream and the second air stream;
    wherein the second plurality of fibers is fluidly coupled with the collector, wherein the first plurality of fibers and the second plurality of fibers are in fluid communication therebetween with the liquid in the collector, and wherein the second air stream is configured to strip and carry away the predetermined type of gas molecules.

2. The HVAC system of claim 1, wherein the HVAC system selectably provides for a reversed flow direction of the predetermined type of gas molecules for continuously removing the predetermined type of gas molecules from the second air stream and releasing the predetermined type of gas molecules into the first air stream.

3. The HVAC system of claim 1, wherein the HVAC system is configured to receive power from a renewable energy source, a waste heat energy source of the HVAC system, or a combination thereof to continuously release the predetermined type of gas molecules into the second air stream.

4. The HVAC system of claim 1, wherein the HVAC system is configured to receive power from a renewable energy source comprising solar energy to continuously release the predetermined type of gas molecules into the second air stream.

5. The HVAC system of claim 1, wherein the HVAC system is configured to receive power from a waste heat energy source that is generated by the condenser coils of the HVAC system during a cooling mode of the HVAC system to continuously release the predetermined type of gas molecules into the second air stream.

6. The HVAC system of claim 1, wherein the predetermined type of gas molecules are selected from the group consisting of water vapor, carbon dioxide, organic compounds, or a combination thereof.

7. The HVAC system of claim 1, wherein the first plurality of fibers and the second plurality of fibers each comprise a plurality of strands.

8. The HVAC system of claim 1, wherein the first plurality of fibers is disposed in a first chamber of a first housing and the second plurality of fibers is disposed in a second chamber of a second housing.

9. The HVAC system of claim 8, wherein the fan is a first fan configured to direct the first air stream within the first chamber, and wherein the HVAC system comprises a second fan configured to direct the second air stream within the second chamber.

10. The HVAC system of claim 1, wherein the first plurality of fibers is positioned upstream of cooling coils of the HVAC system relative to the first air stream, and wherein the cooling coils and the condenser coils are part of a common refrigeration circuit.

11. The HVAC system of claim 1, wherein the first plurality of fibers is positioned upstream of a return air inlet of a packaged rooftop unit of the HVAC system.

* * * * *